United States Patent
Hu et al.

(10) Patent No.: US 11,599,798 B2
(45) Date of Patent: Mar. 7, 2023

(54) METHODS OF OPERATING A GRAPHICS PROCESSING UNIT (GPU) TO TRAIN A DEEP NEURAL NETWORK USING A GPU LOCAL MEMORY AND RELATED ARTICLES OF MANUFACTURE

(71) Applicant: University of Notre Dame du Lac, South Bend, IN (US)

(72) Inventors: Xiaobo Sharon Hu, Granger, IN (US); Danny Ziyi Chen, Granger, IN (US); Xiaoming Chen, Beijing (CN)

(73) Assignee: UNIVERSITY OF NOTRE DAME DU LAC, South Bend, IN (US)

( * ) Notice: Subject to any disclaimer, the term of this patent is extended or adjusted under 35 U.S.C. 154(b) by 472 days.

(21) Appl. No.: 16/819,840

(22) Filed: Mar. 16, 2020

(65) Prior Publication Data
US 2020/0302304 A1    Sep. 24, 2020

Related U.S. Application Data

(60) Provisional application No. 62/978,061, filed on Feb. 18, 2020, provisional application No. 62/819,924, filed on Mar. 18, 2019.

(51) Int. Cl.
*G06T 1/20* (2006.01)
*G06T 1/60* (2006.01)
(Continued)

(52) U.S. Cl.
CPC ............. *G06N 3/084* (2013.01); *G06N 3/063* (2013.01); *G06N 3/10* (2013.01); *G06T 1/20* (2013.01); *G06T 1/60* (2013.01)

(58) Field of Classification Search
CPC ... G06T 1/20; G06T 1/60; G06N 3/02; G06N 3/04; G06N 3/0454; G06N 3/063; G06N 3/08; G06N 3/084; G06N 3/10
(Continued)

(56) References Cited

U.S. PATENT DOCUMENTS

2019/0180143 A1*  6/2019  Lyu .......................... G06T 1/20
2019/0311257 A1* 10/2019  Chang ....................... G06N 3/04

OTHER PUBLICATIONS

Courbariaux et al; *Binarized Neural Networks: Training Neural Networks with Weights and Activations Constrained to +1 or −1*; arXiv: 1602.02830v3; Mar. 17, 2016; 11 pages.
(Continued)

*Primary Examiner* — Jacinta M Crawford
(74) *Attorney, Agent, or Firm* — Stanek Lemon Crouse & Meeks, P.A.

(57) ABSTRACT

A method operating a Graphics Processing Unit (GPU) memory can be provided by accessing specified training parameters used to train a Deep Neural Network (DNN) using a GPU with a local GPU memory, the specified training parameters including at least a specified batch size of samples configured to train the DNN. A sub-batch size of the samples can be defined that is less than or equal to the specified batch size of samples in response to determining that an available size of the local GPU memory is insufficient to store all data associated with training the DNN using one batch of the samples. Instructions configured to train the DNN using the sub-batch size can be defined so that an accuracy of the DNN trained using the sub-batch size is about equal to an accuracy of the DNN trained using the specified batch size of the samples.

17 Claims, 9 Drawing Sheets

(51) Int. Cl.
| | |
|---|---|
| *G06N 3/063* | (2006.01) |
| *G06N 3/08* | (2006.01) |
| *G06N 3/084* | (2023.01) |
| *G06N 3/10* | (2006.01) |

(58) Field of Classification Search
USPC .......................... 345/530; 706/15, 16, 17, 25
See application file for complete search history.

(56) References Cited

OTHER PUBLICATIONS

Rastegari et al; *XNOR-Net: ImageNet Classification using Binary Convolutional Neural Networks*; Springer International Publishing AG (2016); pp. 525-542.

Han et al. *Deep Compression: Compressing Deep Neural Networks with Pruning, Trained Quantization and Huffman Coding*; ICLR (2016); pp. 1-14.

Gupta et al; *Deep Learning with Limited Numerical Precision*; Proceedings of the 32$^{nd}$ International Conference on Machine Learning; W&CP vol. 37 (2015); 10 pages.

Lin et al; *Fixed Point Quantization of Deep Convolutional Networks*; ICLR (2016); pp. 1-15.

Rhu, et al. *vDNN: Virtualized Deep Neural Networks for Scalable, Memory-Efficient Neural Network Design*; NVIDIA; Jan. 16, 2016; 13 pages.

Han et al.; *Learning Both Weights and Connections for Efficient Neural Networks*; arXiv:1506.02626v3 [cs.NE]; Oct. 30, 2015; pp. 1-9.

Gruslys et al; *Memory-Efficient Backpropagation Through Time*; 30$^{th}$ Conference on Neural Information Processing Systems (2016); pp. 1-9.

http://mxnet.incubator.apache.org/versions/1.6/; Jan. 16, 2016; 6 pages.

https://github.com/Microsoft/CNTK; Feb. 28, 2018; 15 pages.

* cited by examiner

```
1   T = 0; // T is the current time
2   for task t = 1, 2, ···, |T| in topological order do
        // Prepare for task t's inputs and output
3       Allocate memories for any d ∈ I(t) that is not in GPU
        memory and for O(t);
4       if allocation fails then
5           Find an offloading scheme (do defragmentation
            when necessary) and then re-allocate;
6       Load any d ∈ I(t) that is not in GPU memory;
7       if offloading and data loading cause delay $T_{cost}$ then
8           $T += T_{cost}i$
        // Select convolution algorithm for task t
9       if task t is convolution related then
10          for all possible algorithms for task t do
11              Select the algorithm with the maximum gain
                (defined in Eq. (10));
12          Allocate workspace (do offloading when
            necessary) for the selected algorithm alg;
13          if offloading for workspace allocation causes
            delay $T_{off,alg}$ then
14              $T += T_{off,alg}i$ // T is now the start time of
                task t // Prefetch data for future tasks
15      for s = t + 1, t + 2, ···, |T| do
16          if defragmentation will be conducted for task s
            then
17              Break;
18          else if at least one d ∈ I(s) that is not in GPU
            memory then
19              if prefetching for task s should start now then
20                  Allocate memory for prefetching;
21                  if allocation fails then
22                      if an offloading scheme can be found
                        then
23                          Do offloading, re-allocation and
                            prefetching for task s;
24                      else
25                          Break;
26              else
27                  Break;

28      $T = FT(t) = T + T_{alg}(t)$; // T is now the finish time
        of task t. $T_{alg}(t)$ is the execution time of algorithm
        alg of task t.
        // Free data that will not be used
29      for d ∈ I(t) do
30          if d will no longer be used then
31              Free d;
```

FIG. 3

METHODS OF OPERATING A GRAPHICS PROCESSING UNIT (GPU) TO TRAIN A DEEP NEURAL NETWORK USING A GPU LOCAL MEMORY AND RELATED ARTICLES OF MANUFACTURE

CLAIMS FOR PRIORITY

The present Application claims priority to U.S. Provisional Application Ser. No. 62/819,924 entitled System and Method for Memory Management of Deep Neural Network Training, filed in the U.S.P.T.O on Mar. 18, 2019, and to U.S. Provisional Application Ser. No. 62/978,061entitled Memory Optimal Deep Neural Network Training on Graphics Processing Units, filed in the U.S.P.T.O on Feb. 18, 2020 the entire disclosures of which are hereby incorporated herein by reference.

STATEMENT OF FEDERAL SUPPORT

This invention was made with United States Government support, under grants CCF-1217906, CNS-1629914, CCF-1617735 and CCF-1640081, awarded by the National Science Foundation (NSF) and under Cooperative Agreement No. 70NANB17H041. The Government has certain rights in the invention.

FIELD

The present invention relates to the field of neural networks in general, and more particularly, to training of neural networks.

BACKGROUND

Deep neural networks (DNNs) have shown great promise in numerous machine learning applications, such as image processing, object detection, speech recognition, natural language processing. A variety of DNNs have been developed (e.g., VGG-Net, GoogLeNet, U-Net, residual networks (ResNet), fully convolutional networks (FCN), etc.), that target different applications. A number of software frameworks have also been developed to implement deep learning, e.g., Caffe, Tensor-Flow, Theano, Torch, etc., which have greatly facilitated the development and applications of DNNs.

Studies have demonstrated that increasing the scale of neural networks (NNs) can significantly improve the accuracy of NN results. These results have largely promoted the investigation of scaling up NNs. Some DNNs have hundreds of or even over 1000 layers. Such large-scale DNNs have raised significant challenges on conducting DNN training efficiency. Thanks to the tremendous computational efficiency offered by graphics processing units (GPUs), training large-scale DNNs has become feasible in recent years. Nowadays, almost all the existing deep learning frameworks support DNN training on GPUs, by invoking GPU libraries such as cuBLAS and cuDNN based on the compute unified device architecture (CUDA).

Although the computational performance of current GPUs has been increasing steadily, the GPU memory size can still be a major obstacle which may restrict the maximum scale of DNNs that can be trained on GPUs. During DNN training weights, activations, temporary data, and any workspace in the GPU memory, pose a high memory usage requirement. The memory usage of state-of-the-art DNNs can easily reach tens of or even over 100 gigabytes, which greatly exceed the memory size of current high-end GPUs. If a DNN cannot fit into the given GPUs' memory, usually one has to reduce the scale of the network (e.g., using a network with fewer layers and/or parameters), which can cause undesirable accuracy loss.

A number of approaches have been investigated to reduce memory usage for DNN training: network pruning, precision reduction, output re-computation, static memory allocation, batch partitioning, and out-of-core training. Among these, network pruning and precision reduction can lead to accuracy loss, and output re-computation can lead to high performance (i.e., training time) degradation. The last three approaches do not incur any accuracy loss, where out-of-core training offers higher memory usage reduction than static memory allocation. Following the idea of out-of-core training, NVIDIA recently proposed vDNN, where data that are not being used are offloaded to the host memory, and are dynamically prefetched into GPU memory when required. vDNN does not incur any accuracy loss, but is rather brute-force (simply offloading the outputs of all layers or all convolutional layers). Batch partitioning is very efficient for memory usage reduction, but existing DNN frameworks which support batch partitioning just leave the setting of the partitioning to users, which cannot guarantee the best partitioning.

SUMMARY

Embodiments according to the present invention can provide methods of operating a graphics processing unit (GPU) to train a deep neural network (DNN) using a GPU local memory and related articles of manufacture GPU memory. Pursuant to these embodiments, a method of operating a GPU memory can be provided by accessing specified training parameters used to train a DNN using a GPU with a local GPU memory, the specified training parameters including at least a specified batch size of samples configured to train the DNN. A sub-batch size of the samples can be defined that is less than or equal to the specified batch size of samples in response to determining that an available size of the local GPU memory is insufficient to store all data associated with training the DNN using one batch of the samples. Instructions configured to train the DNN using the sub-batch size can be defined so that an accuracy of the DNN trained using the sub-batch size is about equal to an accuracy of the DNN trained using the specified batch size of the samples.

BRIEF DESCRIPTION OF THE DRAWINGS

FIG. 3 is listing of code that illustrates exemplary operations of data transfer scheduling and convolution selection in some embodiments according to the invention.

DETAILED DESCRIPTION OF EMBODIMENTS ACCORDING TO THE INVENTION

Figure 1:
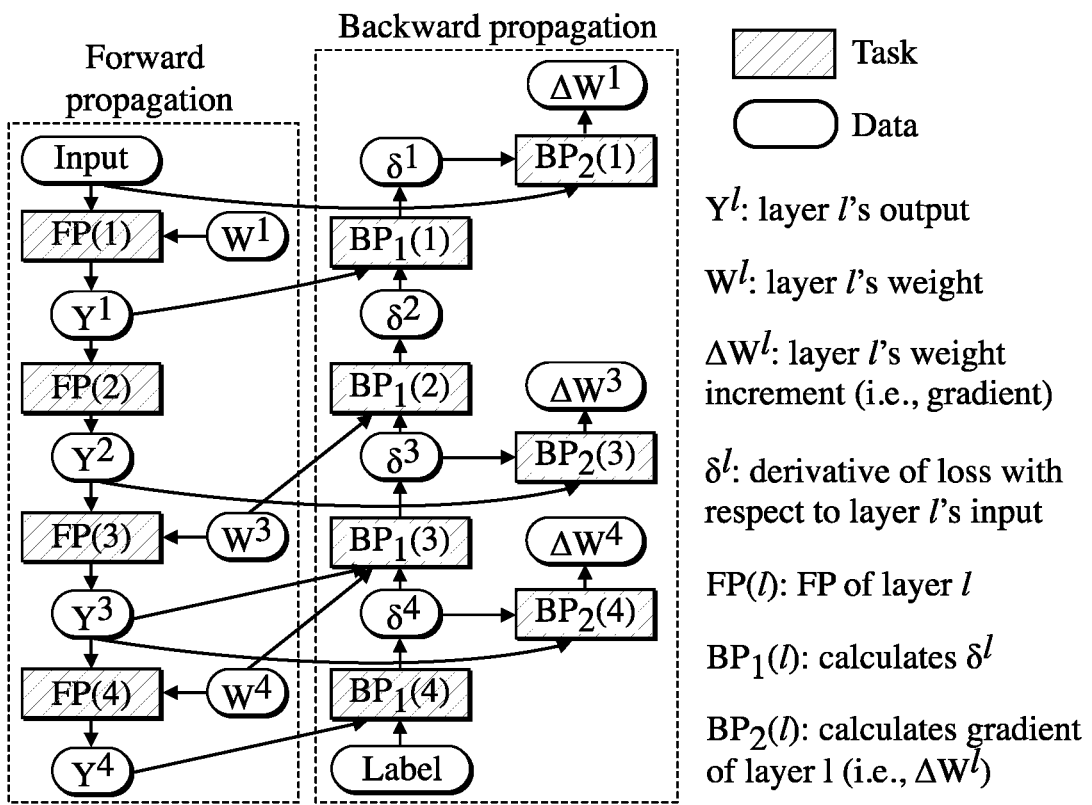
FIG. 1 illustrates a task and data flow graph TDFG for an example 4-layer convolutional neural network (CNN).

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As appreciated by the present inventors, embodiments according to the invention aim to tackle the memory challenge of DNN training on GPUs by proposing a memory optimal DNN training framework for GPUs, herein referred to as moDNN. moDNN not only enables the training of much larger-scale DNNs on a single GPU, but also helps reduce the memory quota on multiple GPUs. moDNN is based on the general concept of out-of-core training. However, in moDNN, we have designed new heuristics to judiciously schedule data transfers and select convolution operations such that both memory usage and performance are optimized. We also adopt the idea of batch partitioning to cooperate with data transfer scheduling to further reduce memory usage without affecting the accuracy. moDNN can automatically select the sub-batch size such that both memory usage and performance are optimized. With batch partitioning, moDNN is able to handle any user-specified batch size, as long as the memory budget is not smaller than the theoretical lower bound of the memory requirement. By integrating these techniques, moDNN can automatically produce training code for any given DNN and memory budget without losing accuracy, while achieving superior performance by ensuring that the memory usage tightly fits the memory budget. All the above techniques are applicable to both single-GPU and multiple-GPU systems.

moDNN has been implemented in an in-house DNN framework. A number of experiments based on VGG-Nets, ResNets and an FCN were conducted. Experimental results show that moDNN can save memory usage up to 59 times, compared with an ideal case which assumes that the GPU memory is sufficient to hold all data. When executing moDNN on a GPU with 12 GB memory, the performance was degraded by only 3%, which is much shorter than that incurred by vDNN. moDNN achieved 3.7× speedup on four GPUs, compared with the ideal case on a single GPU.

There is a wide range of approaches to reduce memory usage for DNN training. They can be generally classified into six categories: network pruning, precision reduction, output re-computation, static memory allocation, batch partitioning, and out-of-core training.

Network pruning tries to prune insignificant weights without degrading accuracy much. By choosing a proper pruning strategy, most of the small weights can be pruned without significant loss of accuracy. As a result, both the performance and energy efficiency can be improved. However, weights may only account for a small fraction of the total memory usage for large-scale DNNs, so pruning weights is not very effective for reducing memory usage, especially for large-scale DNNs.

Many recent studies have exploited the use of fixed-point or binary representations instead of floating-points to boost the performance of DNNs, which also lead to significant memory usage savings. However, the accuracy is only verified for the studied DNNs and there is no theoretical guarantee that the accuracy will not be affected much with lower-precision numbers for all DNNs. In other words, lower precision may lead to severe accuracy loss for other DNNs.

While the above methods are primarily targeted at performance improvement, which also help reduce memory usage of DNNs, some studies have considered how to directly optimize memory usage. The output re-computation approach discards some layers' outputs when the memory is insufficient, and re-computes them when required. In other words, this approach sacrifices training time to improve memory usage, hence can incur high performance degradation.

MXNet adopts a static memory allocation method to reduce memory usage. It has a number of fixed-size buffers and uses a graph-coloring process to assign data to buffers based on the live intervals of data. It can result in redundant memory requirement, because the memory requirement is the total size of all the buffers, and the buffers cannot be fully filled at the same time. In addition, data with long live intervals must reside in the GPU memory during their live intervals, resulting in wasted memory consumption. Thus, this method may not be very effective to reduce memory usage.

Some DNN frameworks support partitioning a training batch into multiple sub-batches, such that the memory requirement is reduced by approximately a factor of the number of sub-batches. However, these DNN frameworks leave the partitioning to users, which cannot guarantee optimal partitioning. Furthermore, since current DNN frameworks typically put all required data on GPU, the sub-batch size tends to be small for large-scale DNNs, leading to performance degradation due to lowered GPU resource utilization.

Rather than always keeping the required data in the GPU memory, vDNN, adopted the idea of data offloading and prefetching. This method utilizes the feature of modern GPUs that computations and data transfers can be overlapped. In vDNN, data that are not being used are offloaded to the host memory, and are dynamically prefetched (i.e., when called for) into GPU memory before they are used. vDNN does not incur any accuracy loss, and the performance loss is somewhat small, but simply offloading the outputs of all layers or all convolutional layers may not be the best solution.

DNNs are commonly trained by a backward propagation (BP) process together with an optimization method (e.g., gradient descent). The purpose of DNN training is to minimize the error as a function of the weights of the DNN. Typically, a complete training process includes many iterations; an iteration includes a forward propagation (FP) pass and a BP pass using a batch (i.e., subset) of training samples. Note that besides gradient descent, batch-based training is also used in other DNN training process (e.g., conjugate gradient). moDNN is applicable to all batch-based training methods and we just use gradient descent, the most popular DNN training method, as an example to describe the methodologies of moDNN.

An FP pass computes the DNN's output from the first layer to the last layer. The FP computation of one layer (say, layer 1) can be described by:

$$Z^l = g^l(X^l, W^l), Y^l = f^l(Z^l) \quad (1)$$

where X and Y are the input and output, respectively, Z is an intermediate variable, and W is the weight. g performs some operation on the input and weight (e.g., for convolutional and fully-connected layers, g computes inner products, and for pooling layers, g downsamples the input), and f is an activation function. Once the FP pass is finished, one can calculate the error E for each sample in the training batch by comparing the DNN's output with the ground truth (i.e., label).

A BP pass propagates the error in the opposite direction (from the last layer to the first layer) to update the weights. The BP computation of one layer can be divided into three steps. The first step (BP1, error back propagation) calculates the derivative of the error with respect to each layer's Z, which is denoted by δ. δ is an "error sensitivity" term that measures how much that layer is responsible for any errors in the DNN's output. $\delta^l$ is calculated from the higher layers' δ's according to the chain rule:

$$\delta^l = \frac{\partial E}{\partial Z^l} = \sum_{s \in L} \frac{\partial E}{\partial Z^s} \cdot \frac{\partial Z^s}{\partial Y^l} \cdot \frac{\partial Y^l}{\partial Z^l} = \frac{df^l}{dZ^l} \cdot \sum_{s \in L} \delta^s \cdot \frac{\partial g^s}{\partial Y^l} \quad (2)$$

where L is a set that contains those immediate successor layers taking layer 1's output as an input. The second step (BP2) calculates the weight increment (i.e., the gradient) for each layer, which, according to the gradient descent method, is expressed as:

$$\Delta W^l = -\eta \cdot \frac{\partial E}{\partial W^l} = -\eta \cdot \delta^l \cdot \frac{\partial g^l}{\partial W^l} \quad (3)$$

where η is the learning rate. Equation (3) is for one sample. Since we use a batch of training samples in each iteration, the gradient should be averaged across the batch, i.e., $$\Delta W^l = -\frac{\eta}{N} \sum_{n=1}^{N} \delta_n^l \cdot \frac{\partial g^l(X_n^l, W^l)}{\partial W^l} \quad (4)$$

where N is the batch size. After the first and second steps of all layers are finished, the last step (BP3) is performed for all layers to accumulate the weight increments $$W^l += \Delta W^l. \quad (5)$$

The training process of one iteration is like a U-shape curve. In other words, during FP, all layers are computed in the forward order, and during BP, all layers are computed in the reversed order. We can build a task and data flow graph (TDFG), which is a directed acyclic graph (DAG), to depict all the data dependencies during the training of one iteration. FIG. 1 illustrates the TDFG for an example 4-layer convolutional neural network (CNN). The TDFG depicts all the detailed data dependencies at the task and data block level. The BP3 tasks (weight update, corresponding to (5)) are not drawn in the TDFG of FIG. 1 to avoid forming cycles. The weight update is performed after all the tasks in the TDFG are finished, hence omitting the BP3 tasks does not affect the dependencies. For convolution related tasks, a temporary workspace may be needed (not shown in FIG. 1), since fast convolution process (e.g., the Winograd algorithm) typically need some workspace. By utilizing TDFGs, moDNN is able to handle any complex dependencies in DNN training.

To understand why offloading and prefetching can reduce memory usage of DNN training, note that actually we do not need to always keep any involved data in the GPU memory during training. All the tasks in a TDFG are topologically sorted and will be executed sequentially on GPU following this order in training. This means that, if a task is to be executed, we only need to store its input data, output data and temporary workspace in the GPU memory. Other data are not required. This gives an opportunity that when a task is executing, if we have some free memory, we can load the input data of future tasks to the GPU memory, overlapping with the execution of the task. On the other hand, if a task's output will not be used for a long time, it can be offloaded to the host memory to vacate some space. The offloading operation can also be overlapped with executions of tasks.

In the TDFG, the sizes of all data blocks are known from the given DNN and batch size. To produce an optimal schedule, we also need the execution times of the tasks and the transfer times of the data blocks. They are measured by conducting a profiling step before training. Since a training process usually includes thousands of or even more iterations, adding a profiling step has negligible effect on the overall performance. For large-scale DNNs, we have observed that weights (i.e., ΔW's and W's) typically consume a very small fraction of the total memory usage. Thus in moDNN, weights can be maintained in the GPU memory and not offloaded.

CUDA memory management functions cudaMalloc and cudaFree can be called to allocate and free GPU memories. By calling native CUDA functions, however, we cannot control the distribution of data in the memory space. This is not desirable since we seek to optimize memory usage. Instead, embodiments according to the present invention implement a simple tool to manage GPU memory. This memory manager performs virtual allocation and free operations during the scheduling process. The moDNN framework records all the allocated memory addresses (i.e., offsets) for generating the training code. Before training, a single GPU memory space (i.e., a memory pool) is allocated. The recorded offsets are added to the head address of the pool to generate the actual addresses during training.

The memory manager utilizes the conventional linked list based implementation to allocate and free memories. A doubly-linked list is used to store the spatial distribution of the memory space. The nodes in the linked list store the starting addresses, sizes, and states (occupied or free) of the segments in the memory space. Allocation/free operations insert/delete nodes into/from the linked list. There are different memory allocation strategies. Considering the fact that some data blocks are of the same size (e.g., Y and δ in the same layer), we adopted a two-step allocation method. For a memory allocation request, we first search for a free block whose size is exactly equal to the requested size, which helps reduce "holes" (i.e., fragmentations) in the memory space. If this operation fails, the first found free block that is big enough to hold the requested size is allocated. Note that allocation and free operations are invoked during scheduling. After a schedule is produced, all the offsets are determined.

As appreciated by the present inventors, given a DNN with training parameters (e.g., batch size, number of iterations, learning rate, etc.) and one or more GPUs, it can be assume that the GPU memory size or a user-specified memory budget (if given) is insufficient to hold all data associated with the training using one batch of samples. moDNN, therefore should make the DNN trainable on the given GPU platform, keeping any given training parameter unchanged, such that the performance (i.e., the total training time) is optimized without affecting accuracy.

At the highest level, moDNN adopts the idea of out-of-core process. Leveraging the fact that modern GPUs support overlapping computations and data transfers, we can offload data which are not being used to the host memory, and when they will be used, they are prefetched to the GPU memory in advance.

Figure 2:
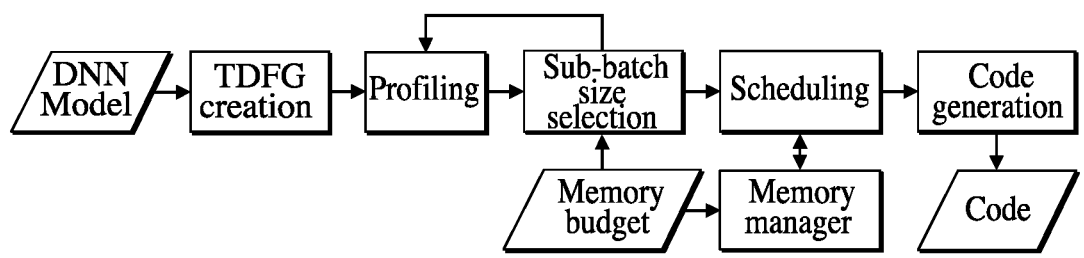
FIG. 2 illustrates an moDNN framework in some embodiments according to the invention.

The moDNN framework is shown in FIG. 2, and is built on the following three techniques.

1) Data offloading and prefetching. Modern GPUs support overlapping computations and data transfers, which enables offloading unused data to the host memory with negligible cost. moDNN judiciously selects data to offload or prefetch.

2) Sub-batch size selection. Reducing the batch size is a natural approach for reducing memory usage. However, different batch sizes often result in different accuracies. In moDNN, we partition a batch into multiple sub-batches and accumulate the gradients from all the sub-batches at the completion of each batch, resulting in unchanged accuracy. This is a general approach and is not restricted to gradient descent. The sub-batch size is automatically selected by moDNN.

3) Convolution process selection. Convolution can be implemented by different methods on GPUs, such as general matrix multiplication (GEMM), implicit GEMM, the Winograd algorithm, fast Fourier transform, etc. Fast convolution methods (e.g., the Winograd process) typically need some workspace so the convolution process must be carefully selected when optimizing memory usage.

Among these techniques, the first is architecture related, and the other two are application related. So moDNN explores both architecture- and application-level features to optimize memory usage for DNN training. moDNN first builds the TDFG based on the given DNN. It then determines the sub-batch size based on the profiling results and the memory budget. Profiling aims to measure the tasks' execution times and the data blocks' transfer times. Since profiling needs the sub-batch size to obtain accurate measurements, profiling and sub-batch size selection are performed iteratively until the sub-batch size converges. Next, moDNN computes a schedule for data offloading and prefetching together with convolution process selection. The scheduling goal is to minimize the finish time of the TDFG, maintaining that the memory usage never exceeds the memory budget. Instead of dynamically scheduling the training process, moDNN produces a static schedule for the given DNN and GPU platform. Since the TDFG structure and dependency relations do not change, a static schedule is sufficient to ensure efficient memory usage. The last step generates the training code that can directly run on the given GPU platform based on the schedule.

Finding a globally optimal solution for the three key techniques discussed above is not trivial. Actually, the complexity of the problem is exponential. This can be concluded from the following intuitive explanation. For each task in the TDFG, a number of different choices (e.g., which data to be offloaded, when to offload and prefetch, which process is selected, etc.) are possible. Finding a globally optimal solution is to determine the choices for every task such that the finish time of the TDFG is minimized. Finding the shortest execution time for each task individually does not necessarily lead to the shortest finish time of the entire TDFG, however, because the choice of a task can impact the choices of all the future tasks. Hence, finding a globally optimal solution needs to traverse all possible choices. Suppose task t has Nt choices, the last task will have $\Pi_{t \in T} N_t$ choices in total where T is the task set. Obviously, the search space is exponentially large. Due to the exponential nature of the problem, we resort to developing heuristic process to find a good solution. However, the interaction among the three techniques, which reflects the conflicts between performance and memory usage, is still rather challenging. Using a larger sub-batch size increases the parallelism, and hence improves the performance. However, it leads to more memory usage which can invoke more offloading and prefetching operations and reduce the opportunity of using fast convolution algorithms. Using fast convolution algorithms need some temporary workspace, which may lead to more offloading operations and also reduces the opportunity of prefetching data for future tasks. Considering these conflicting directions, a good starting point of our heuristic algorithms is to comprehensively consider both the benefit and penalty of possible choices such that desirable tradeoffs are achieved.

moDNN has a number of advantages over other approaches, such as vDNN. (1) We introduce an automatic sub-batch size selection method, which cooperates with data transfer scheduling and convolution process selection to optimize memory usage. vDNN does not have this feature. (2) We judiciously select data to offload by comprehensively considering both the benefit and penalty, while vDNN simply offloads the outputs of all layers or all convolutional layers. (3) Convolution algorithms are also carefully selected by considering both the benefit and penalty, while vDNN simply selects the fastest possible process for each task. The three new techniques result in both reduced memory usage and increased performance compared with vDNN, which will be seen from the experimental data.

A task in the TDFG can be executed on a GPU only if the GPU memory is sufficient to hold its input data, output data and temporary workspace during execution (for convolution related tasks). In the TDFG, the weights consume a fixed amount of memory, but the memory usages of the activations, input, label, and δ's are proportional to the batch size. Hence, decreasing the batch size is a natural idea to reduce memory usage. However, changing the batch size can impact the accuracy, which violates our requirements stated herein. In order to attain an equivalent training corresponding to the user-specified batch size, after a batch is partitioned into multiple sub-batches, the training of one batch needs to be done by multiple rounds, and the gradients must be accumulated from all the sub-batches at the completion of each batch. Accumulating gradients from sub-batches on one GPU is natively supported by cuBLAS and cuDNN functions, so no extra overhead is introduced. The idea of partitioning a batch has been used in some DNN frameworks. However, these software packages just leave the setting of the sub-batch size to the users. Instead, in moDNN, this parameter is automatically selected such that the tradeoff between performance and memory usage is well balanced.

We first determine the theoretical lower bound on memory requirement as a function of the sub-batch size. For an individual task t, the minimum memory requirement for sub-batch size b is (excluding the weights which always reside in GPU memory):

$$M_{min}(t, a(t), b) = \sum_{d(b) \in I(t,b)} Size(d(b)) + Size(O(t, b)) + WS(a(t), b) \quad (6)$$

where I(t, b), O(t, b) and WS(a(t), b) are the input data set, output data and workspace of task t, respectively. a(t) represents the process candidate adopted by task t. The memory usages of O(t, b) and I(t, b) are proportional to b but WS(a(t), b) may not. Implicit GEMM requires zero workspace but other convolution algorithms need some temporary workspace. For a single task, the theoretical lower bound of the memory requirement corresponds to when the sub-batch size is 1 and the implicit GEMM convolution process is used.

For the entire TDFG, the theoretical lower bound of the memory requirement is the maximum task-wise memory requirement instead of the sum of all the tasks' requirements, because all the tasks are executed sequentially in a topological-sort order and the memory can be reused for different tasks. According to this observation, the theoretical lower bound of the memory requirement is:

$$M_{min} = S_W + \max_{t \in T} \left\{ \sum_{d(1) \in I(t,1)} Size(d(1)) + Size(O(t, 1)) \right\} \quad (7)$$

where $S_W$ is the total weight memory size. moDNN can generate a proper schedule for any user-specified memory budget and any batch size, as long as the memory budget is not smaller than $M_{min}$.

Actually, the minimum memory requirement can be further reduced, noting that weights always reside in the GPU memory in our current implementation. If we also treat weights as regular data blocks which can be offloaded, the minimum memory requirement can be even lower. For large-scale DNNs, when the sub-batch size is 1, the memory usage is mainly consumed by the weights. In this case, if we keep only the required weights in the GPU memory, then the weight memory usage can be significantly reduced, as well as the total memory usage.

Automatic Sub-Batch Size Selection

We now discuss how to select the sub-batch size based on the user-specified memory budget. We could set the sub-batch size to 1, so that the memory requirement is minimized. However, using a small sub-batch size cannot fully utilize the massive parallelism of GPUs, leading to performance degradation. On the other hand, if the sub-batch size is too big and the memory budget can only hold few tasks, then offloading operations will happen frequently, which may incur severe performance degradation. Therefore, parallelism and memory margin should be carefully balanced when selecting the sub-batch size.

We use the following criterion to select the sub-batch size. The sub-batch size is selected such that any α|T| consecutive tasks in the topological order can be executed on GPUs without any out-of-memory problems. |T| is the number of tasks in the set T. α is an empirical parameter, and we use 15% in this work based on our extensive experiments. The workspace size of the fastest possible process is considered when selecting the sub-batch size. To put it formally, we select the sub-batch size b such that the following value is not larger than the user-specified memory budget:

$$\max_{1 \leq t \leq |T| - \alpha|T| + 1} \left\{ \begin{array}{l} \sum_{k=t}^{t+\alpha|T|-1} \left[ \sum_{d(b) \in I(k,b)} Size(d(b)) + \\ Size(O(k, b)) \end{array} \right] - \\ Size(\text{reused data}, b) + \\ \max_{t \leq k \leq t+\alpha|T|-1} \{WS(a_{fastest}(k), b)\} \end{array} \right\} + S_W. \quad (8)$$

The first term in the outer max operator is the sum of all the input data size and output data size of α|T| consecutive tasks. The second term is the total size of the reused data of these tasks. For example, the output of a task is usually an input of the next task. In this case, the output is reused so we only need to consider its size once. The third term is the workspace size. Since the workspace of different tasks can be reused, we only need the maximum workspace size.

In order to collect the workspace size and performance of all valid convolution algorithms for each task, we conduct a profiling step on the given GPU platform. Profiling in turn requires the sub-batch size in order to get accurate measurements. To deal with this dependency, we iteratively do profiling and sub-batch size selection (see FIG. 2). During the iterations, the sub-batch size is selected in the range from 1 to the user-specified batch size by a binary search. This process continues until the sub-batch size converges.

One of the reasons why the sub-batch size selection method works well can be explained intuitively as follows. On one hand, the sub-batch size is selected such that the memory budget can only hold 15% of the tasks, so the sub-batch size tends to be large and the performance may be guaranteed. On the other hand, keeping the memory of 15% of the tasks on GPUs has sufficient memory margin, even if the memory budget is used up by some tasks. We have observed that the offloading and prefetching latencies can be almost hidden by computations in this situation.

In practice, we find that adding a regularization step which tunes b to be a power of 2 can usually improve the GPU performance. For example, b is tuned to a multiple of 64 if b is larger than 64, to a multiple of 32 if b is between 64 and 32, and so on. The purpose of this operation is to fully utilize the performance of cuDNN, since the process implementation of cuDNN is typically sub-matrix based and the sub-matrix size is naturally a power of 2.

If the sub-batch size thus determined is equal to the user-specified batch size, then it means that we need not partition batches. Otherwise, each batch is partitioned into sub-batches of size b and the training of a batch is done by multiple rounds. The gradients are accumulated from all the sub-batches at the completion of each batch.

Scheduling determines the optimal data transfers and which convolution algorithms to use for all tasks, while satisfying the given memory budget. The objective is to minimize the finish time of the TDFG, which is achieved through (1) maximally overlapping data transfers and computations, (2) minimizing offloading operations, (3) judiciously prefetching future data, and (4) selecting the optimal convolution algorithms. The code listing in FIG. 3 summarizes the scheduling flow. It includes three major operations for each task: (1) preparing the input and output data, which may require offloading certain data, (2) selecting the optimal convolution algorithm, if the task is convolution related, and (3) determining the data to be prefetched for future tasks. The code in FIG. 3 does not perform training but simulates the training process to generate the schedule. The notion of "current time" used in the process flow refers to the time in the simulated execution process.

The code in FIG. 3 simulates the executions of all the tasks in a topological order. For task t which is to be executed, we first prepare its input and output data (lines 3-8). If some input data are not in the GPU memory, we need to first allocate memory spaces and then load the data to the GPU memory. We also allocate memory space for the output at the same time (line 3). If the allocation fails, then we try to offload some data that are not being used (lines 4-5). If an available offloading scheme (which specifies which data to be offloaded) cannot be found, then it must be caused by fragmentations in the memory space, because the sub-batch size selection method guarantees that the memory requirement of any single task does not exceed the memory budget. Defragmentation (offloading all data and then reloading the required data) can solve this problem. Once we have allocated sufficient memory spaces, input data are loaded into the GPU memory (line 6). The delay caused by offloading and data loading is added to the current time (line 8).

If task t is a convolution related task, the best convolution process is selected by considering both the benefit and penalty (lines 9-14). The benefit is the time saved by a faster process compared with implicit GEMM which is treated as the baseline. Due to the workspace required by the faster algorithm, more offloading operations may be required, and some prefetching operations for future tasks have to be delayed. The incurred delays are both included in the penalty. The best process is the one with the maximum gain (benefit minus penalty) (line 11). The delay caused by offloading is added to the current time to get the start time of task t (line 14).

Next, prefetching data is considered for future tasks (lines 15-27). For each future task s (s>t), we first predict whether a defragmentation will be conducted when the time is just before executing task s. If the prediction result is yes, then prefetching is stopped (lines 16-17) for the following reason. When executing task s, if a defragmentation is conducted, all the data in the GPU memory will be offloaded, leading to useless prefetching operations. If prefetching is predicted to be useful, then we determine if the prefetching for task s should start now (before executing task t) by considering whether it will cause delay if the prefetching starts later (line 19). If we decide to prefetch for task s, we then allocate memory spaces (including offloading attempt when the allocation fails) and perform the prefetching (lines 20-23).

Prefetching for future tasks has no impact on the start time of task t since it is overlapped and has no dependency. After prefetching for future tasks is scheduled, task t is executed by updating its finish time (line 28). Finally, we free any data that will no longer be needed (lines 29-31).

The success of the moDNN scheduling operations are configured to find good offloading schemes, determine when to prefetch what data, and select the optimal convolution type. We further elaborate these aspects below. Our discussion of data offloading and prefetching is based on the fact that in practice two CUDA streams StrmC and StrmD are used to execute computations and data transfers respectively, so that they are overlapped.

Offloading is invoked when a memory allocation fails. In this situation, we try to offload some data to vacate their spaces to make available a contiguous space that is not smaller than the requested size. Since we assume that weights cannot be offloaded in moDNN, we can select Y's and δ's (see FIG. 1) to offload to vacate their spaces. Once a data block has been offloaded, it does not need to be offloaded again and it is freed it in future offloading operations, as the host memory already has its copy after the first offloading operation. For the input data and ground truth label, no offloading is required since they are originally copied from the host.

Figure 4:
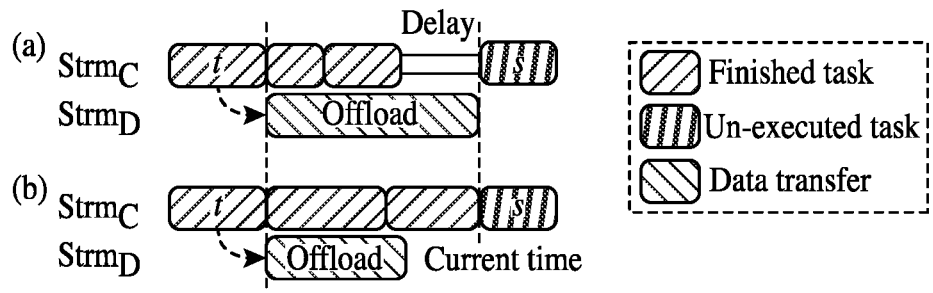
FIG. 4 is a schematic illustration of data offloading operations in some embodiments according to the invention.

Although offloading operations are overlapped with computations, offloading may still cause delay to the next task to be executed (and to all future tasks as well). FIG. 4 is a schematic illustration of data offloading operations in some embodiments according to the invention. In particular, FIG. 4 illustrates two situations. Suppose the memory allocation for task s fails and we have to offload task t's output. The situation of FIG. 4(a) has delay overhead and the situation of FIG. 4(b) does not. During the scheduling process, we record the estimated start and finish times for all the tasks in StrmC and for all the data transfers StrmD. So the delay to the next task caused by an offloading operation can be easily estimated.

Figure 5:
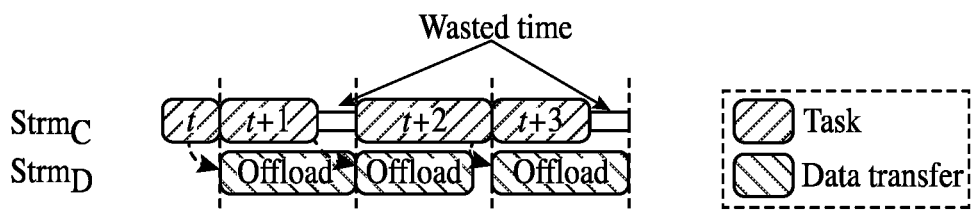
FIG. 5 is a schematic illustration of overlapped data transfer operations accord to the vDNN.

In vDNN, one data transfer can be overlapped with only one computation task, as illustrated in FIG. 5. Actually, this is an unnecessary requirement. It is easy to see that only if a task has a dependency on a data transfer (e.g., a task needs a prefetching operation for its input, or a task is waiting for an offloading operation to re-allocate some memory spaces), the task needs to wait for the data transfer; otherwise, such an imposed requirement is unnecessary, and on the contrary, causes wasted time and increases the synchronization cost.

In moDNN, we handle necessary synchronizations. A necessary synchronization means that a task and a data transfer really have a dependency. As shown in FIG. 4 (also see FIG. 8), we explore more flexible data transfers such that one data transfer can be overlapped with multiple computation tasks, and vice versa. In FIG. 4, there are only two necessary synchronizations here. First, task t's output is offloaded immediately after task t is finished. Second, task s needs to wait for the offloading operation to finish and then task s can re-allocate memory. It is easy to see that our approach can reduce the delay overhead and synchronization cost compared with the vDNN approach.

When performing offloading, the memory spatial distribution should be taken into account because we need a big enough contiguous space instead of multiple dis-contiguous segments. As described herein, we manage the GPU memory using a linked list data structure. The linked list allows us to search easily for an available offloading scheme by traversing the linked list. Searching for an offloading scheme is to find a set of contiguous segments (corresponding to a set of contiguous nodes in the linked list) whose total size is not smaller than the allocation size.

Figure 6:
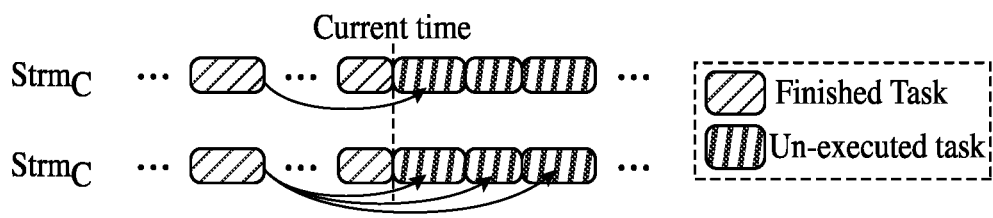
FIG. 6 is a schematic illustration of data used immediately by a next task or set of consecutive tasks.

Before describing how to find an offloading scheme by traversing the linked list, we first describe two criteria for determining whether a data block can be offloaded or freed. (1) If a data block has not been used since its generation (by a task) or its latest prefetching, then it should not be offloaded or freed. This is easy to understand since we want to minimize unnecessary data transfers. (2) If a data block will be used immediately, then it should not be offloaded or freed either. A data block to be used immediately means that it will be used either by the next task that is to be executed, or by a set of consecutive tasks immediately from the next task, as depicted in FIG. 6. A data block that does not meet these two criteria can be offloaded or freed when searching for an offloading scheme.

Figure 7:
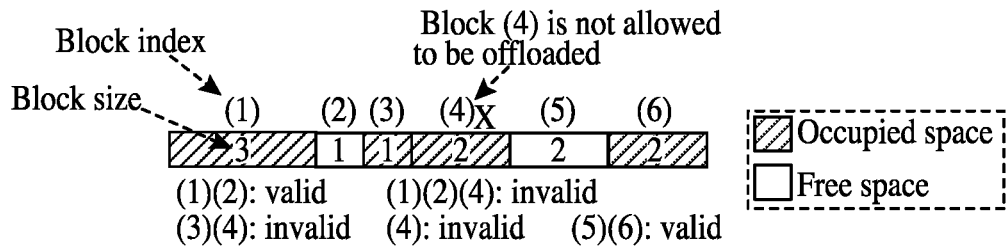
FIG. 7 shows an example for offloading scheme selection in some embodiments according to the invention.

To find an offloading scheme (lines 5, 12, and 22 in Algorithm 1), we traverse the linked list. For each node in the linked list, we take its corresponding data block as the first block that is to be offloaded. Contiguous data blocks at higher addresses are considered, to see if they can form a contiguous space that is not smaller than the requested size. If a data block that cannot be offloaded or freed is reached but the total size is still insufficient, then this scheme is invalid. We traverse all valid offloading schemes and select the scheme with the lowest delay overhead. It is possible that no valid offloading scheme can be found. This is caused by fragmentations in the memory space. In this situation, we offload all data and then reload the required data for the next task (i.e., defragmentation). FIG. 7 shows an example for offloading scheme selection, in which data block (4) is not allowed to be offloaded. For an allocation of size 4, we find two valid offloading schemes (1)(2) and (5)(6). The final scheme is determined based on the delay overhead.

Once a data block has been offloaded, it needs to be prefetched when it is required. The prefetching operation should finish before the task (say, task s) that needs the data starts (otherwise, task s would be delayed). However, prefetching should not start too early since the prefetched data consume memory and are not needed by tasks executed before s. Therefore, the start time of a prefetching operation should be carefully determined. Another issue is the usefulness of the prefetching operation. When task s is to be executed, all the input data should be in the GPU memory and the output memory should be allocated. If the GPU memory cannot hold all the inputs and the output, we need to do a defragmentation. In this case, the prefetched data are freed without being used, leading to a useless prefetching operation. Considering these factors, we should carefully decide whether a prefetching operation is useful and when it should start.

Figure 8:
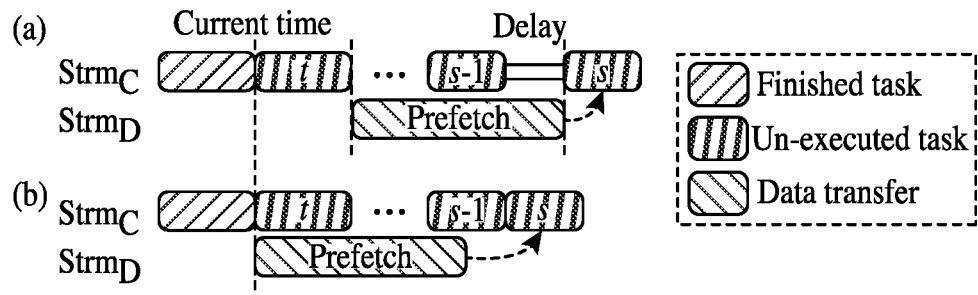
FIG. 8 is schematic illustration of how to determine the start time of a prefetching operation in some embodiments according to the invention.

Prefetching is scheduled only after a task (t−1) is finished and before the next task (t) starts. This can be easily synchronized by CUDA events in the implementation. There is no easy way to start a prefetching operation at an arbitrary time. FIG. 8 explains how to determine the start time of a prefetching operation. The current time is just before the execution of task t. Whether the prefetching operation for task s should start now is determined by the following criterion. We check whether it will cause delay to task s if the prefetching operation is scheduled after task t is finished, i.e., if the following inequality holds:

$$T + T_{alg}(t) + \sum_{\substack{d \in I(s) \text{ and} \\ d \text{ is not in GPU memory}}} T_{trans}(d) > EST(s) \qquad (9)$$

where $T_{alg(t)}$ is the execution time of operations alg for task t, $T_{trans(d)}$ is the transfer time (the same for offloading and prefetching) of data d, and EST(s) is the expected start time of task s. If (9) holds, then prefetching for task s should start now, i.e., before task t (line 19 in the operations of FIG. 3). Otherwise, the prefetching for task s will be examined again after task t finishes and before task t+1 starts.

In (9), the expected start time EST is estimated by the following method. Before scheduling, the ESTs of all the tasks are estimated by assuming that all tasks use the fastest algorithm. During scheduling, some delay can be incurred by offloading, prefetching, defragmentation, or slower operations. Once a delay is introduced to a task, the same amount of delay is added to the ESTs of all the future tasks.

The necessity of this operation is explained as follows. Suppose we are considering the prefetching for task s and the current time is before task t starts. When executing task s, we need to allocate memory spaces for its output and any input data which are not in the GPU memory. If the allocation fails, then we need to do offloading or defragmentation. If the prefetched data are freed by defragmentation, then it is a useless prefetching operation. To avoid such waste, we need to predict if a defragmentation will be conducted when task s is to be executed. This can be achieved by predicting the memory distribution at a future time. However, it may not be possible to predict the exact future memory distribution because the choices made for the future tasks before task s (i.e., tasks t, t+1, . . . , s−1) impact the scheduling of task s, and these choices, in turn, depend on the current decision (i.e., whether the prefetching operation for task s is useful). Hence, we resort to conducting an approximate prediction by guessing the scheduling for tasks t, t+1, . . . , s−1. The prediction method is described below.

Since we do not know which data will be offloaded and which data will be prefetched during the scheduling for tasks t, t+1, . . . , s−1, we assume two strategies to predict the future memory distribution. First, we assume that any data block in the GPU memory can be offloaded except for the case if it meets one of the two criteria which prevent offloading unused data. This assumption leads to an upper bound on the free memory space at a future time. Second, we assume that any possible prefetching operations which may be scheduled after task t and before task s (for any required data that are not in the GPU memory during this time interval) are scheduled, regardless of whether these prefetching operations are useful or not in practice. This assumption gives the maximum opportunity of prefetching data to future tasks. Furthermore, we can predict exactly which data will be freed according to lines 29-31 of the operations in FIG. 3. With these strategies, we get an estimation of the total free memory space at a future time. Based on this, we can predict whether a defragmentation is required when preparing for task s's input and output data, by simply judging if the predicted free space is sufficient to hold task s's input and output.

Different convolution algorithms (e.g., GEMM, implicit GEMM, the Winograd algorithm, fast Fourier transform, etc) have different performance and memory requirements, which are collected in the profiling step. Implicit GEMM requires zero workspace so it is treated as the baseline. Other algorithms may be faster but require some workspace.

Always using the fastest process for every task is not the best choice, because the allocation of the workspace may increase data offloading operations for the current task, and also reduce the opportunity of prefetching data for future tasks. In theory, it can impact all the future tasks, yielding an exponential search space. For heuristics, we look ahead only one future task in moDNN.

For task t, we check all possible algorithms one by one by considering both the benefit and penalty. There are only less than 10 convolution algorithms implemented by cuDNN, so checking all possible algorithms for each task is an inexpensive operation. We consider the following "gain":

$$\Delta T_{alg}(t) = T_{base}(t) - T_{alg}(t) - T_{off,alg}(t) - T_{pre,alg}(u) \quad (10)$$

where u is the nearest future task that needs to prefetch data, $T_{base}(t)$ is the execution time of the baseline algorithm, $T_{off,alg}(t)$ is the offloading time needed by the workspace allocation for alg, and $T_{pre,alg}(u)$ is the delayed prefetching time for task s. $T_{off,alg(t)}$ is estimated using the method shown in FIG. 3. $T_{pre,alg}(u)$ is estimated by considering the memory requirement of the prefetching for task u and the workspace size of process alg for task t. In other words, we can find out how many prefetching operations for task u have to be delayed due to the workspace allocation for alg of task t. Note that this operation is different from predicting whether a prefetching operation for a future task is useful, because here we just need to check the current memory distribution instead of predicting a future memory distribution. To select the optimal process for task t, we just select the process with the maximum $\Delta Talg(t)$ defined in (10).

In this section, we discuss how to extend the proposed moDNN framework to multiple GPUs. We only consider multiple GPUs on a single computer in this paper. Distributed training is out of the scope of this paper. We first analyze the bottleneck of a naive extension of moDNN, and then propose our optimization strategy.

Generally, there are two approaches to parallelize DNN training on multiple GPUs: data parallelism and model parallelism. This paper adopts a direct extension of moDNN to multiple GPUs via data parallelism, which is much simpler to implement than model parallelism. Each GPU has two streams, StrmC and StrmD, for computations and data transfers, respectively. One point to mention is that since all the StrmD streams share the same peripheral component interconnect express (PCI-e) bus, the transfer speed for each GPU is lowered compared to the single-GPU case. A direct extension of moDNN is described as follows. First, a batch is partitioned into multiple equal-sized portions. Then, each GPU processes one portion using the schedule produced by moDNN. Finally, the gradients are accumulated from all the GPUs (each GPU may accumulate the gradients from all sub-batches first).

The above straightforward extension, however, is quite inefficient on multiple GPUs. The major bottleneck comes from the gradient accumulation step. This is mainly due to that the PCI-e bus is not fast enough and the GPU-to-GPU communications must be through the PCI-e bus. Regardless whether we use GPUs or central processing units (CPUs) to accumulate the gradients, we always need to first transfer the gradients to the host memory and then transfer them to the GPUs' memories, either explicitly (by two cudaMemcpy calls) or implicitly (by one cudaMemcpyPeer call). Such gradient transfers consume a large portion of the total time. Although NVIDIA has developed NVLink recently to provide higher data transfer speed and support direct GPU-to-GPU communications, the PCI-e bus is still very widely used now. Thus it is important to develop optimization approaches for PCI-e bus based GPU platforms, which is the focus of this work.

Instead of putting gradient transfers and accumulations in the last step of each training iteration, we propose to transfer and accumulate gradients during each iteration. To see why this idea works, note that it is unnecessary to do gradient accumulation in the last step of each iteration. Take W4 in FIG. 1 as an example. $W^4$ can be updated by $W^4 += \Delta W^4$ after $\Delta W^4$ is produced by BP2 (4) and the last use of W4 (i.e., task BP1 (3)) is finished (otherwise, a read/write contention may occur). Furthermore, we notice that during training, the CPUs are only in charge of invoking GPU tasks, and thus they are idle most of the time.

In order to reduce the cost of gradient accumulations, we propose to perform gradient accumulations with the CPUs. This approach also helps utilize the host resources. Based on this idea, gradient transfers can be interleaved with other data transfers (i.e., offloading and prefetching operations) and can also be overlapped with computations. Furthermore, gradient accumulations by the CPUs can be overlapped with GPU computations, so that the overhead caused by gradient transfers and accumulations can be significantly reduced. However, this new approach can still introduce some overhead to the training time. First, since gradient transfers are inserted in the offloading and prefetching lists, it may cause delay to future data transfers. Second, gradient accumulations are executed by CPUs which are much slower than GPUs, so they may cause delay.

Figure 9:
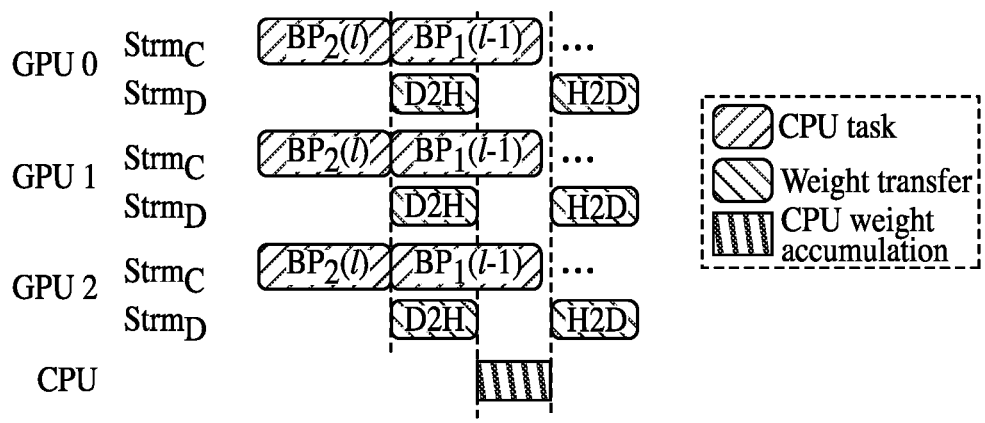
FIG. 9 is a schematic illustration of a gradient transfer and accumulation method in some embodiments according to the invention.

FIG. 9 illustrates our proposed approach. Once any GPU produces a $\Delta W^1$ by task BP2(l), we transfer it to the host memory by adding an offloading operation in StrmD. (FIG. 8 does not show offloading or prefetching operations of other data.) Then the host CPUs perform an accumulation operation. After the gradient accumulations from all $\Delta W^1$'s are finished on the host, we can transfer the resulting W1 to all the GPUs by inserting a prefetching operation in each GPU's StrmD. The new weights will be used in the next training iteration. Before invoking such host-to-device transfers, we also need to wait for the last use (i.e., task BP1 (1-1)) of the corresponding $W^1$ to finish. If the training samples assigned to each GPU are partitioned into multiple sub-batches, the gradient transfers and accumulations by the CPUs are only invoked during the training of the last sub-batch. For all the other sub-batches in each iteration, the gradients are accumulated on each GPU. It is likely that the gradient transfer operations of the same layer invoked by all the GPUs are executed simultaneously, since all the GPUs tend to run synchronously, as shown in FIG. 9. But, note that except for the ending of each iteration, we do not perform any other synchronization for all the GPUs to make them run synchronously. The synchronous execution is just an expected phenomenon since all GPUs run the same tasks.

If we have M GPUs, then this gradient accumulation approach produces 2M cudaMemcpy calls for one layer's weights. This means that the overhead of gradient transfers increases linearly as the number of GPUs increases. We have observed that our approach is generally good on four GPUs. It can be expected that the proposed approach would perform poorer on systems with more GPUs, due to the following reason. With more GPUs, the workload of each GPU becomes smaller, but the overhead of gradient transfers becomes even higher. Since typically there are at most four GPUs on a single computer, our approach is still of significance in practice. For more GPUs on multiple computers, other approaches have been proposed to reduce the machine-to-machine communication overhead, which are out of the scope of this paper. However, our approach is complementary to such approaches, because moDNN can always be applied to the GPUs on each single machine, in a distributed environment.

As a final note of this section, the purpose of moDNN is to reduce the memory usage of DNN training but not to optimize the gradient accumulation step. When implementing moDNN on multiple GPUs, the overhead incurred by gradient transfers and accumulations can also be partially eliminated by leveraging the fundamental idea of moDNN (i.e., overlapping data transfers and GPU computations). The resulting approach, in turn, benefits moDNN on multiple GPUs.

moDNN is implemented using C++ and CUDA. Experiments were conducted on a Linux server equipped with four NVIDIA K40 GPUs. Each K40 GPU has 12 GB memory. The host memory size is 256 GB which is sufficient to handle our test cases. We use cuDNN to compute convolution and pooling operations, and use cuBLAS to compute matrix-matrix multiplications for fully-connected layers.

We used the following DNNs to evaluate our moDNN framework: VGG-16, VGG-19, VGG-101 (created by increasing the convolutional layers of VGG-19), ResNet-34, ResNet-152, and a fully convolutional network (FCN). These DNN models are of different scales and applicability. The batch sizes of the six DNNs are 256, 256, 128, 256, 256, and 128, respectively, which are widely used in practice.

In this section, the "ideal case" refers to the assumption that the GPU memory is sufficient to hold all data and workspaces needed during training. The fastest convolution process is always assumed in the ideal case. The ideal case together with vDNN is treated as the baseline for memory usage and performance comparisons. If the memory requirement of the ideal case exceeds 12 GB, then we run each task individually and accumulate the computation time to estimate the overall training time. For the training time, we refer to the training time of one batch (i.e., one iteration).

Figure 10:
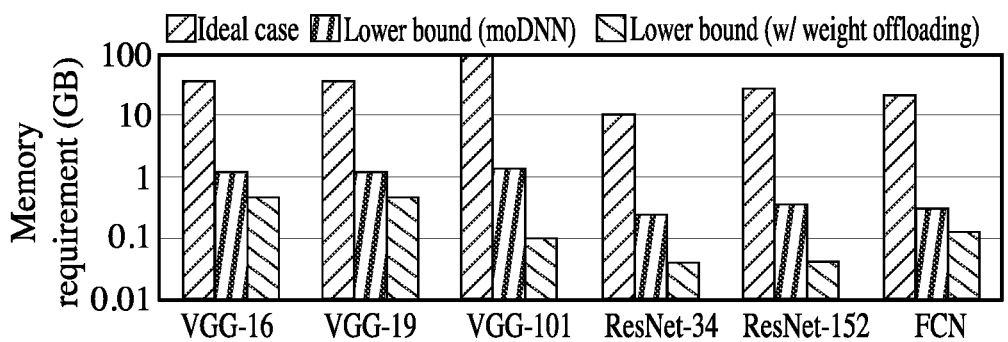
FIG. 10 shows the memory requirements by the ideal case and the lower bound of moDNN in some embodiments according to the invention.

FIG. 10 shows the memory requirements by the ideal case and the lower bound of moDNN. The lower bound which is calculated by (7) is the minimum memory requirement achievable by moDNN and is independent of how many GPUs we are using. Except ResNet-34, the other five DNNs all need more than 12 GB memory for the ideal case, so they cannot be trained directly on one K40 GPU. Even for the latest GPUs with 24 GB memory, the three VGG networks and ResNet-152 still cannot be trained. However, as shown in FIG. 10, moDNN greatly reduces the memory requirement. The lower bound corresponds to the sub-batch size of 1. Compared with the ideal case, the memory requirement lower bound is reduced by 59' on average. Even for VGG-101 which requires nearly 100 GB memory by the ideal case, the memory requirement lower bound of moDNN is only 1.4 GB, which can easily fit into almost all low-end GPUs or even embedded GPUs.

The minimum memory requirement can be further reduced if we also offload weights. FIG. 10 also shows the memory requirements of this case. If weights can also be offloaded, the memory requirement lower bound is reduced by 396' on average compared with the ideal case. The reduction rate generally increases with the increase of the DNN scale. However, since the current implementation of moDNN can already reduce the memory requirement to a very low level, we do not offload weights in the current implementation of moDNN.

If we look at the trend of the memory requirement reduction for the DNNs of the same type (e.g., the three VGG networks or the two ResNets), we can see that the memory requirement reduction rate increases with the increase of the DNN scale. This observation can be simply explained as follows. When the scale of a DNN increases, the total memory usage tends to increase proportionally, as the memory is mainly consumed by all the layers' Y's and δ's. However, the memory consumption of the weights does not increase so rapidly, which also means that the theoretical lower bound of the memory requirement does not increase significantly (since most of the weight memory usage is typically consumed by fully-connected layers). This observation implies that moDNN can attain higher memory requirement reduction for larger-scale DNNs.

We do not compare the memory requirement between vDNN and moDNN here, because the original vDNN does not have the feature of sub-batch size selection. However, we can easily apply our sub-batch size selection to vDNN. From this point of view, the theoretical lower bound of the memory requirement of (modified) vDNN should be identical to that of moDNN. If sub-batch size selection is not applied to vDNN, then moDNN can save more than 10' memory usage than vDNN.

Figure 11:
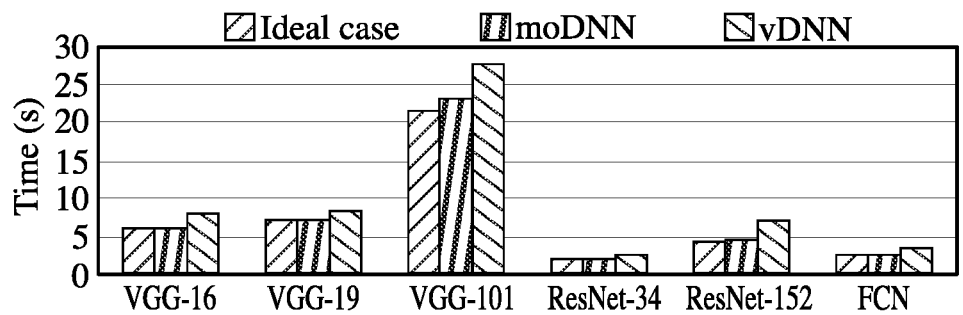
FIG. 11 shows the comparison on the training time of one batch.

We tested moDNN and vDNN on one K40 GPU. The memory size of a K40 GPU is 12 GB (the actual available memory size is a little smaller than 12 GB). FIG. 11 shows the comparison on the training time of one batch. The average performance degradation (i.e., training time increase) of moDNN is only 3%, while vDNN incurs 31% performance degradation on average, compared with the ideal case. The performance degradation of moDNN is mainly caused by the additional synchronizations and the lowered performance of using the sub-batch sizes that are smaller than the user-specified batch sizes. For vDNN, however, the performance degradation is mainly due to the wasted time caused by the unnecessary waiting in the inflexible data transfer scheduling (see FIG. 5).

Figure 12:
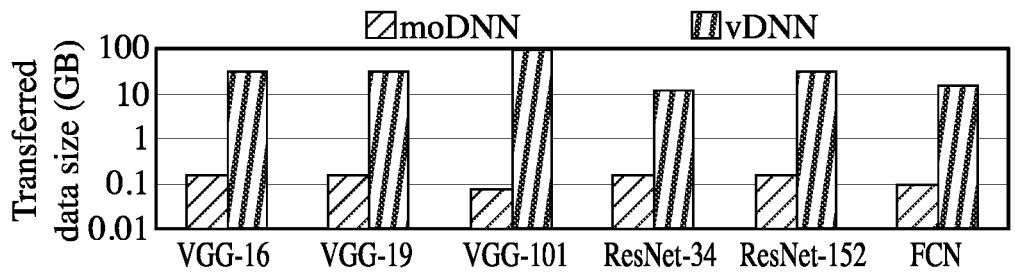
FIG. 12 compares the transferred data sizes including both offloading and prefetching.

FIG. 12 compares the transferred data sizes (including both offloading and prefetching). By judiciously selecting the sub-batch sizes and also the data to be transferred, moDNN reduces the amount of data transfer by 378' on average, compared with vDNN, under a 12 GB memory budget. The high reductions in the transferred data size mainly come from our sub-batch size selection and the judicious selection of data to offload and prefetch. Since vDNN does not support sub-batch size selection, once the memory budget cannot hold all the involved data, it offloads the outputs of all layers or all convolutional layers, leading to many offloading and prefetching operations. moDNN supports sub-batch size selection, so that using smaller sub-batch sizes gives rise to larger free memory space so as to reduce offloading and prefetching operations. In addition, moDNN judiciously selects data to offload, which further reduces the size of offloaded data.

Figure 13:
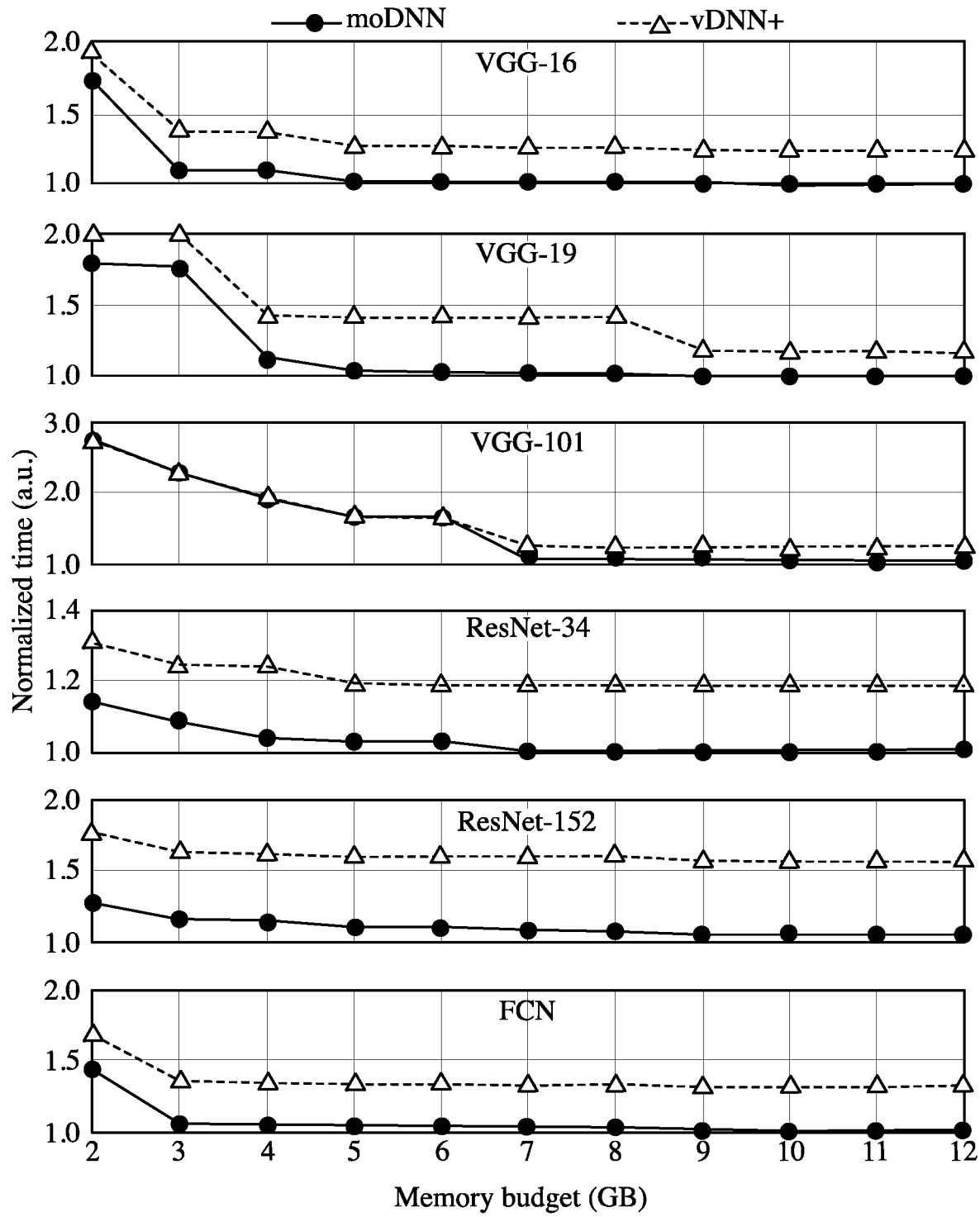
FIG. 13 shows the performance results under different memory budgets on one K40 GPU in some embodiments according to the invention.

An important feature of moDNN is its ability to fit any user-specified memory budget as long as the memory budget is not smaller than the theoretical lower bound. FIG. 13 shows the performance results under different memory budgets (on one K40 GPU). Since vDNN does not support sub-batch size selection, it fails when the memory budget is smaller than some threshold. To make a fair comparison, we also apply our sub-batch size selection method to vDNN, and the resulted approach is called vDNN+. The training times of moDNN and vDNN+ are both normalized to the corresponding DNN's ideal-case training time. The performance becomes poorer as the memory budget decreases. moDNN always attains better performance than vDNN+. This is mainly due to our new data transfer scheduling and convolution process selection methods. For all the data points we have tested in FIG. 13, moDNN achieves an average speedup of 1.26' against vDNN+.

Figure 14:
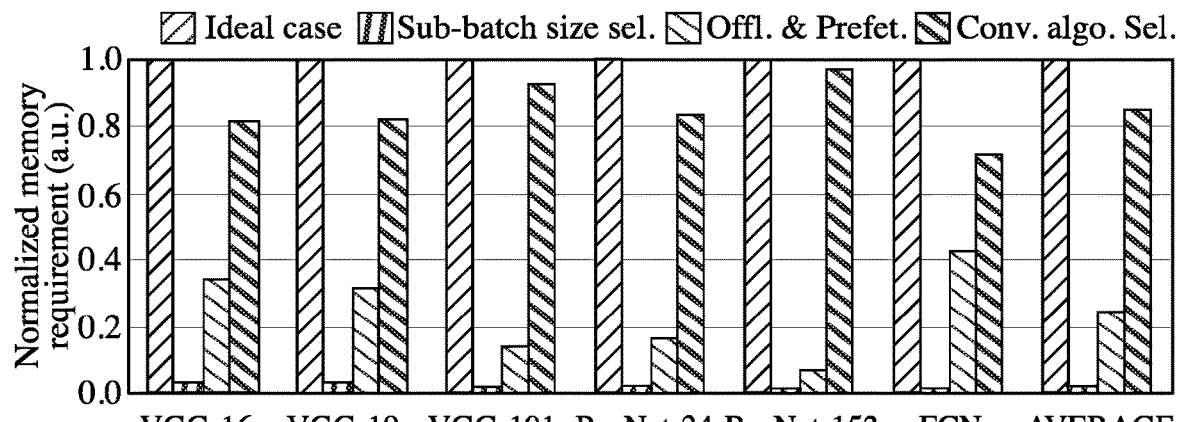
FIG. 14 shows the results of an evaluation of the maximum memory reduction that can be achieved by each technique in some embodiments according to the invention.

Here we analyze the impacts of the three proposed techniques individually on memory usage and performance. We first evaluate the maximum memory reduction that can be achieved by each technique. FIG. 14 shows the results. From the normalized memory requirements, sub-batch size selection is the most efficient technique on memory usage reduction, and it achieves 42' reduction on average compared with the ideal case. This is easy to understand because we can set the sub-batch size to 1 to achieve the maximum memory reduction. If we only apply data offloading and prefetching, an average a memory requirement reduction of 4.1' can be achieved. This is also approximately the maximum memory reduction that the original vDNN can achieve, since vDNN does not have the feature of sub-batch size selection. Convolution process selection can only reduce the memory requirement by 15% on average. This also means that the workspace typically consumes ~15% of the total memory usage.

Figure 15:
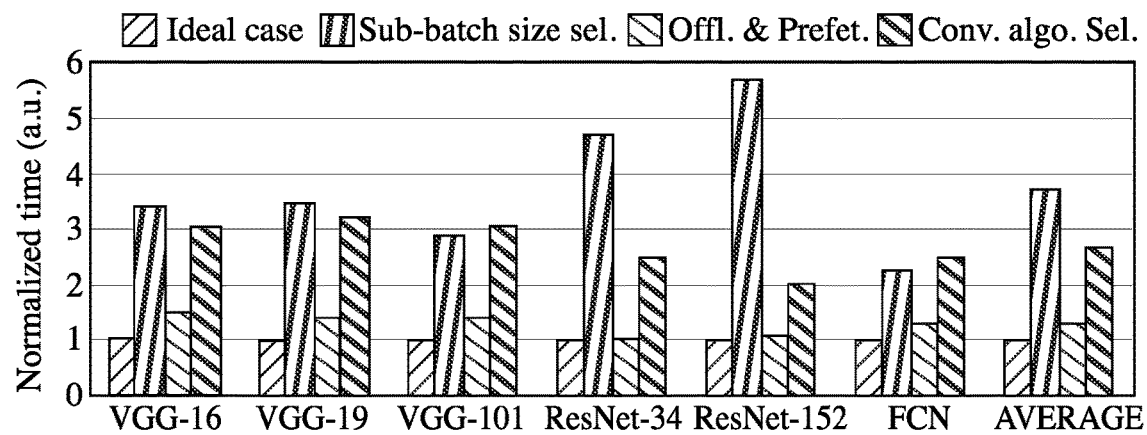
FIG. 15 shows the results of an evaluation of the performance impact of each individual technique on one K40 GPU with a 12 GB memory budget in some embodiments according to the invention.

We then evaluated the performance impact of each individual technique on one K40 GPU with a 12 GB memory budget. The results are shown in FIG. 15. The performance is estimated when each technique achieves the maximum memory reduction. Although sub-batch size selection has the largest effect on memory reduction, it leads to the highest performance degradation, which is 3.74' on average when the memory requirement is minimized. This is due to the fact that sub-batch size of 1 significantly under-utilizes the GPU resources. If we only apply data offloading and prefetching, the average performance degradation is 28%. From FIG. 10, we know that the average performance degradation of moDNN is only 3% on one K40 GPU. This difference is mainly due to sub-batch size selection. Without sub-batch size selection, the memory budget may be used up so lots of offloading, prefetching, and defragmentation operations need be invoked, leading to serious performance degradation. If we only apply the convolution process selection such that the memory usage is minimized, the performance is degraded by 2.7' on average. Combining with the breakdown analysis for memory requirement, we know that a small memory overhead (~15%) used for workspace can greatly improve the performance (by 2.7').

The above memory/performance breakdown analysis reveals that applying any single technique cannot achieve the best performance and memory usage reduction simultaneously. The observation demonstrates that the superiority of moDNN stems from the effective combination of the three techniques.

Figure 16:
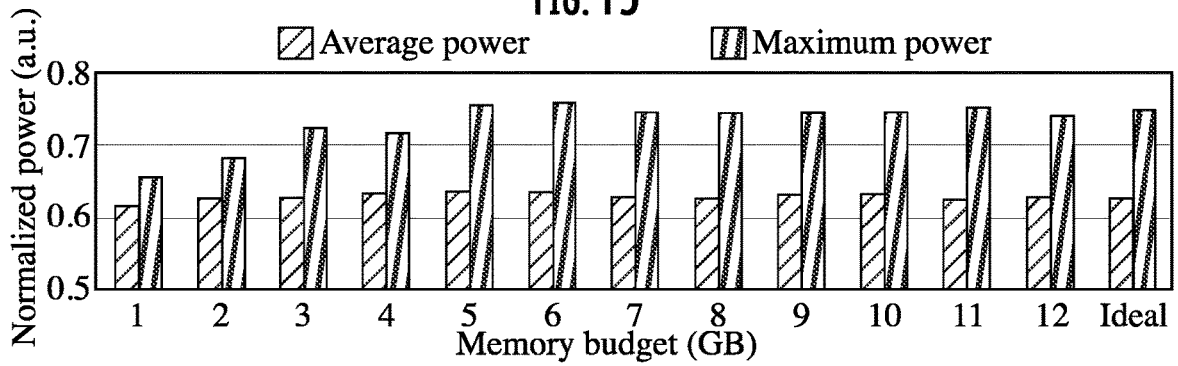
FIG. 16 shows the measured average power and maximum power consumption associated with the use of the moDNN in some embodiments according to the invention.
Figure 17:
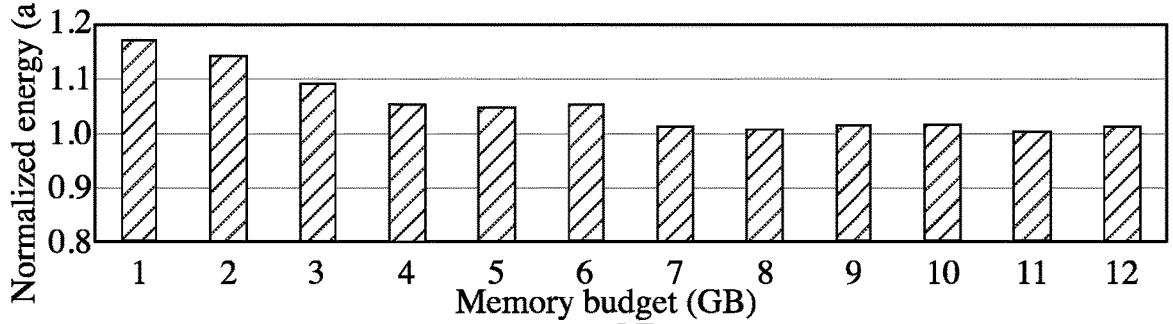
FIG. 17 shows the normalized energy consumption of ResNet-34.

Here we discuss the impact of moDNN on the GPU power and energy consumptions. We measure the average power and maximum power using the profiling tool nvprof provided by the CUDA toolkit. Only ResNet-34 is tested to analyze the power and energy consumptions because only ResNet-34 can be trained on one K40 GPU in the ideal case. FIG. 16 shows the measured average power and maximum power. We observe that the average power is rarely affected, compared with the ideal case. The average power is slighted increased (<3%) when the memory budget is 5 GB or 6 GB. In this case, the sub-batch size is still 256 but there is not too much free space, so that more offloading and prefetching operations are invoked, consuming some additional power. When the memory budget is smaller than 5 GB, the sub-batch size is smaller than 256 by our sub-batch size selection approach. In this case, the hardware utilization is lowered so the average power is slightly reduced and the maximum power is also reduced with the decrease of the sub-batch size. Since the average power is rarely affected, the energy consumption of training mainly depends on the training time. FIG. 17 shows the normalized energy consumption of ResNet-34. The energy consumption increases with the decrease of the memory budget. The trend is very similar to the performance trend depicted in FIG. 13.

Here we describe the results of moDNN with the proposed gradient accumulation approach on four K40 GPUs. The baseline is the ideal case implemented on four GPUs. In the ideal case, it is assumed that there is sufficient memory on each GPU. Different from moDNN, in the ideal case, the gradients are accumulated by one GPU. In other words, a GPU (without loss of generality, say, GPU 0) is in charge of gradient accumulation. At the completion of each training iteration, all the other GPUs send the gradients to GPU 0, and GPU 0 performs weight update and then sends the updated weights to all the other GPUs. In moDNN, gradient accumulations are executed by the CPUs. Our experimental platform is equipped with two Intel Xeon E5-2630 v4 CPUs (20 cores in total) running at 2.2 GHz.

Figure 18:
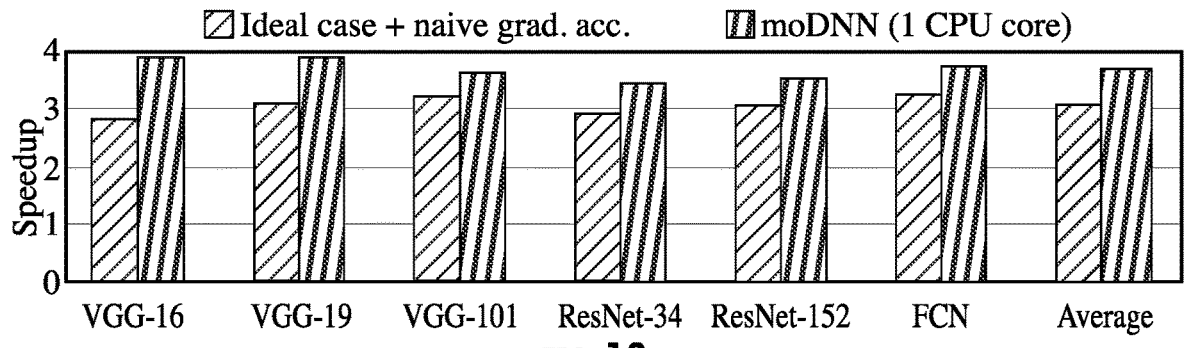
FIG. 18 shows the speedups (against the 1-GPU ideal case) of the ideal case (with naive gradient accumulation) and moDNN on four GPUs. Remember that in moDNN, each GPU deals with a subset of the training samples.

FIG. 18 shows the speedups (against the 1-GPU ideal case) of the ideal case (with naive gradient accumulation) and moDNN on four GPUs. Remember that in moDNN, each GPU deals with a subset of the training samples. The subset on each GPU may be further partitioned into sub-batches by our sub-batch size selection method. For the reported results in FIG. 18, only one CPU core is used. This is the worst case for gradient accumulation. The ideal case achieves 3.1× average speedup on four GPUs. Since the gradient transfers and accumulations in the ideal case are executed at the completion of each training iteration, this mimics a sequential process appended to each parallel training iteration. Such overhead considerably limits the scalability of the ideal case on multiple GPUs. moDNN achieves 3.7× average speedup on four GPUs. As can be seen, by utilizing overlapped gradient transfers and GPU computations, the proposed approach significantly improves the scalability of moDNN on multiple GPUs.

Figure 19:
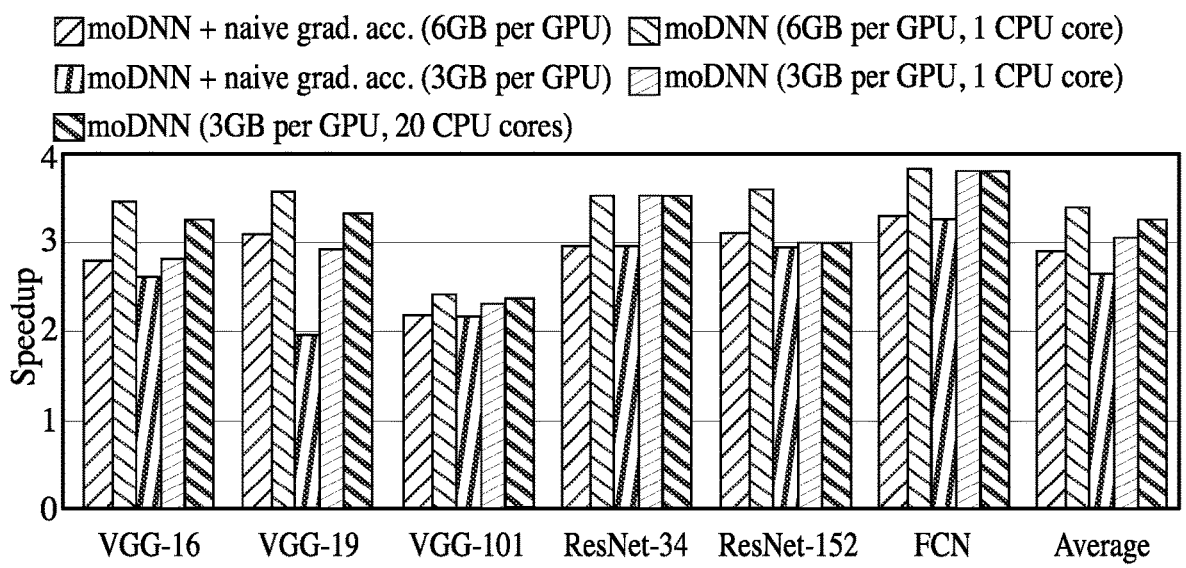
FIG. 19 shows an evaluation of moDNN on four GPUs with smaller per-GPU memory budgets in some embodiments according to the invention.

We then evaluated moDNN on four GPUs with smaller per-GPU memory budgets, as shown in FIG. 19. Since memory budget is considered, the ideal case which assumes sufficient memory is not applicative. Thus, to show the advantages of the proposed gradient accumulation approach, we consider moDNN with the naive gradient accumulation approach as the baseline. Under the same per-GPU memory budget (6 GB and 3 GB respectively), the proposed gradient accumulation approach is always better than the naive approach. When the per-GPU memory budgets are 6 GB and 3 GB respectively, moDNN with 1-core gradient accumulation achieves 3.4× and 3.1× average speedups, respectively, against the 1-GPU ideal case, while the average speedups achieved by moDNN with the naive gradient accumulation approach are 2.9× and 2.6×, respectively. Our experiments reveal that using more CPU cores to perform gradient accumulations can reduce the gradient accumulation time by up to 2-3×. The low improvement is mainly due to the low workload of gradient accumulation. We evaluated moDNN with 20-core gradient accumulation under the 3 GB per-GPU memory budget, as shown in FIG. 19. The average speedup against the 1-GPU ideal case is 3.2×.

Figure 20:
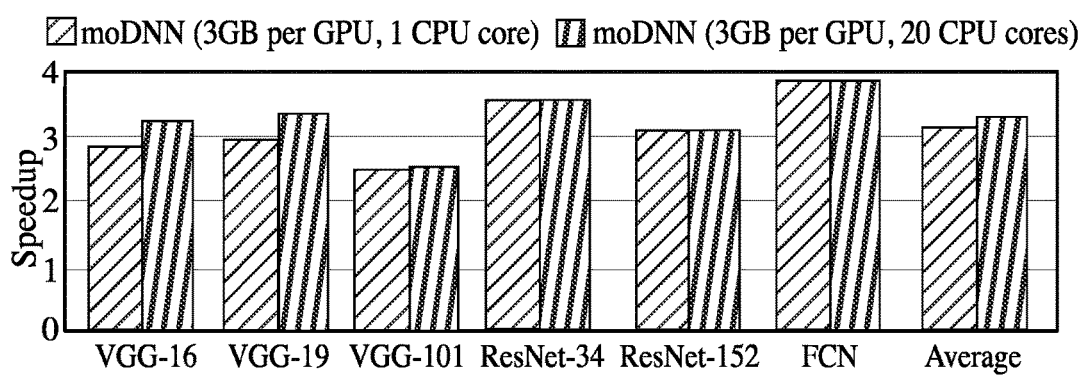
FIG. 20 shows a comparison of moDNN on four GPUs with moDNN on one GPU in some embodiments according to the invention.

In FIG. 20, we compare moDNN on four GPUs with moDNN on one GPU. The memory budgets of the two cases are identical, so that in the 4-GPU case, each GPU has a memory budget of 3 GB. The average speedups are 3.1× and 3.3× when we use 1 core and 20 cores to perform gradient accumulations, respectively.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

What is claimed:

1. A method operating a Graphics Processing Unit (GPU), the method comprising:
   accessing specified training parameters used to train a Deep Neural Network (DNN) using a GPU with a local GPU memory, the specified training parameters including at least a specified batch size of samples configured to train the DNN;
   defining a sub-batch size of the samples that is less than or equal to the specified batch size of samples in response to determining that an available size of the local GPU memory is insufficient to store all data associated with training the DNN using one batch of the samples; and
   generating instructions configured to train the DNN using the sub-batch size so that an accuracy of the DNN trained using the sub-batch size is equal to an accuracy of the DNN trained using the specified batch size of the samples, wherein the method further comprises:
   prior to training the DNN, determining a static schedule of off-loading data to a host and data prefetching from the host for tasks to be used during training of the DNN based on a simulation of training the DNN; and
   applying the static schedule of off-loading data and data prefetching during the training of the DNN.

2. The method of claim 1 wherein generating the instructions comprises generating the instructions configured to accumulate all errors generated from training the DNN using the sub-batch size of the samples to complete the specified batch size of the samples to provide an error for the specified batch size.

3. The method of claim 1 wherein the sub-batch size of the samples is defined so that any 15% of consecutive tasks occurring in topographical order in a task flow data graph representing training of the DNN can be stored in the sub-batch size of the samples.

4. The method of claim 1 wherein sub-batch size of samples greater than or equal to 1 and less than or equal to the specified batch size of samples.

5. The method of claim 1 wherein determining the static schedule comprises simulating execution of all tasks in a task flow data graph representing training of the DNN in topological order.

6. The method of claim 5 further comprising:
   selecting a convolution kernel for use by the GPU to train the DNN from among a plurality of convolution kernels based on a combination of a performance associated with each of the plurality of convolution kernels offset by an off-loading factor for each of the plurality of convolution kernels and a prefetch delay for each of the plurality of convolution kernels for a given size for each of the sub-batch size.

7. A method operating a Graphics Processing Unit (GPU), the method comprising:
   accessing specified training parameters used to train a Deep Neural Network (DNN) using a GPU with a local GPU memory, the specified training parameters including at least a specified batch size of samples configured to train the DNN;
   defining a sub-batch size of the samples that is less than or equal to the specified batch size of samples in response to determining that an available size of the local GPU memory is insufficient to store all data associated with training the DNN using one batch of the samples; and
   generating instructions configured to train the DNN using the sub-batch size so that an accuracy of the DNN trained using the sub-batch size is equal to an accuracy of the DNN trained using the specified batch size of the samples, wherein the sub-batch size of the samples is defined using the following relationship:

$$\max_{1 \le t \le |T| - \alpha|T|+1} \left\{ \begin{array}{l} \sum_{k=t}^{t+\alpha|T|-1} \left[ \sum_{d(b) \in I(k,b)} \text{Size}(d(b)) + \text{Size}(O(k,b)) \right] - \\ \text{Size (reused data, } b) + \\ \max_{t \le k \le l+\alpha|T|-1} \{WS(a_{fastest}(k), b)\} \end{array} \right\} + S_W,$$

wherein T is all consecutive tasks occurring in topographical order in a task flow data graph representing training of the DNN, the first term in the outer max operator is the sum of input data and output data for 15% of consecutive tasks occurring in topographical order in T, the second term in the outer max operator is the total size of reused data in the 15% of consecutive tasks occurring in topographical order in T, and the third term is a maximum work space size for the fastest convolution kernel to complete each task in the 15% of consecutive tasks occurring in topographical order in T.

8. A method operating a Graphics Processing Unit (GPU), the method comprising:
   accessing specified training parameters used to train a Deep Neural Network (DNN) using a GPU with a local GPU memory, the specified training parameters including at least a specified batch size of samples configured to train the DNN;
   defining a sub-batch size of the samples that is less than or equal to the specified batch size of samples in response to determining that an available size of the local GPU memory is insufficient to store all data associated with training the DNN using one batch of the samples; and
   generating instructions configured to train the DNN using the sub-batch size so that an accuracy of the DNN trained using the sub-batch size is equal to an accuracy of the DNN trained using the specified batch size of the samples, wherein defining the sub-batch size of the samples further comprises:
   (a) determining a simulated execution time for tasks included in a task data flow graph of the DNN;
   (b) determining a simulated execution time for data transfers included in the task data flow graph of the DNN;

(c) determining the sub-batch size of the samples using the simulated execution time for tasks and the simulated execution time for data transfers; and repeating operations (a)-(c) using the determined sub-batch size of the samples until the sub-batch size of the samples converges to a solution.

9. A method of training a Deep Neural Network (DNN) using a Graphics Processing Unit (GPU), the method comprising:

partitioning a batch of samples configured to train a DNN using a GPU local memory into a plurality of sub-batches wherein a maximum size of any of the plurality of sub-batches is sufficient to store 15% of any consecutive operations performed by the GPU to train the DNN; the method further comprising:

prior to training the DNN, determining a static schedule of off-loading data to a host and data prefetching from the host for tasks to be used during training of the DNN based on a simulation of training the DNN; and applying the static schedule of off-loading data and data prefetching during the training of the DNN.

10. A non-transitory computer-readable medium whose contents, when executed by a computing system, cause the computing system to perform operations for operating a Graphics Processing Unit (GPU), the operations comprising:

accessing specified training parameters used to train a Deep Neural Network (DNN) using a GPU with a local GPU memory, the specified training parameters including at least a specified batch size of samples configured to train the DNN;

defining a sub-batch size of the samples that is less than or equal to the specified batch size of samples in response to determining that an available size of the local GPU memory is insufficient to store all data associated with training the DNN using one batch of the samples; and generating instructions configured to train the DNN using the sub-batch size so that an accuracy of the DNN trained using the sub-batch size is equal to an accuracy of the DNN trained using the specified batch size of the samples, the operations further comprising:

prior to training the DNN, determining a static schedule of off-loading data to a host and data prefetching from the host for tasks to be used during training of the DNN based on a simulation of training the DNN; and applying the static schedule of data off-loading and data prefetching during the training of the DNN.

11. The non-transitory computer-readable medium of claim 10 wherein generating the instructions comprises generating the instructions configured to accumulate all errors generated from training the DNN using the sub-batch size of the samples to complete the specified batch size of the samples to provide an error for the specified batch size.

12. The non-transitory computer-readable medium of claim 10 wherein the sub-batch size of the samples is defined so that any 15% of consecutive tasks occurring in topographical order in a task flow data graph representing training of the DNN can be stored in the sub-batch size of the samples.

13. The non-transitory computer-readable medium of claim 10 wherein sub-batch size of the samples greater than or equal to 1 and less than or equal to the specified batch size of samples.

14. The non-transitory computer-readable medium of claim 10 wherein determining the static schedule comprises simulating execution of all tasks in a task flow data graph representing training of the DNN in topological order.

15. The non-transitory computer-readable medium of claim 14 further comprising:

selecting a convolution kernel for use by the GPU to train the DNN from among a plurality of convolution kernels based on a combination of a performance associated with each of the plurality of convolution kernels offset by an off-loading factor for each of the plurality of convolution kernels and a prefetch delay for each of the plurality of convolution kernels for a given size for each of the sub-batch size.

16. A non-transitory computer-readable medium whose contents, when executed by a computing system, cause the computing system to perform operations for operating a Graphics Processing Unit (GPU), the operations comprising:

accessing specified training parameters used to train a Deep Neural Network (DNN) using a GPU with a local GPU memory, the specified training parameters including at least a specified batch size of samples configured to train the DNN;

defining a sub-batch size of the samples that is less than or equal to the specified batch size of samples in response to determining that an available size of the local GPU memory is insufficient to store all data associated with training the DNN using one batch of the samples; and generating instructions configured to train the DNN using the sub-batch size so that an accuracy of the DNN trained using the sub-batch size is equal to an accuracy of the DNN trained using the specified batch size of the samples, wherein the sub-batch size of the samples is defined using the following relationship:

$$\max_{1 \le t \le |T|-\alpha|T|+1} \left\{ \begin{array}{l} \sum_{k=t}^{t+\alpha|T|-1} \left[ \sum_{d(b) \in I(k,b)} \text{Size}(d(b)) + \text{Size}(O(k,b)) \right] - \\ \text{Size(reused data, } b) + \\ \max_{t \le k \le t+\alpha|T|-1} \{WS(\alpha_{fastest}(k), b)\} \end{array} \right\} + S_W,$$

wherein T is all consecutive tasks occurring in topographical order in a task flow data graph representing training of the DNN, the first term in the outer max operator is the sum of input data and output data for 15% of consecutive tasks occurring in topographical order in T, the second term in the outer max operator is the total size of reused data in the 15% of consecutive tasks occurring in topographical order in T, and the third term is a maximum work space size for the fastest convolution kernel to complete each task in the 15% of consecutive tasks occurring in topographical order in T.

17. A non-transitory computer-readable medium whose contents, when executed by a computing system, cause the computing system to perform operations for operating a Graphics Processing Unit (GPU), the operations comprising:

accessing specified training parameters used to train a Deep Neural Network (DNN) using a GPU with a local GPU memory, the specified training parameters including at least a specified batch size of samples configured to train the DNN;

defining a sub-batch size of the samples that is less than or equal to the specified batch size of samples in response to determining that an available size of the local GPU memory is insufficient to store all data associated with training the DNN using one batch of the samples; and generating instructions configured to train the DNN using the sub-batch size so that an accuracy of the DNN trained using the sub-batch size is equal to an accuracy of the DNN trained using the specified batch size of the samples, wherein defining the sub-batch size of the samples further comprises:
(a) determining a simulated execution time for tasks included in a task data flow graph of the DNN;
(b) determining a simulated execution time for data transfers included in the task data flow graph of the DNN;
(c) determining the sub-batch size of the samples using the simulated execution time for tasks and the simulated execution time for data transfers; and
repeating operations (a)-(c) using the determined sub-batch size of the samples until the sub-batch size of the samples converges to a solution.

* * * * *

UNITED STATES PATENT AND TRADEMARK OFFICE
CERTIFICATE OF CORRECTION

PATENT NO. : 11,599,798 B2
APPLICATION NO. : 16/819840
DATED : March 7, 2023
INVENTOR(S) : Hu et al.

Page 1 of 2

It is certified that error appears in the above-identified patent and that said Letters Patent is hereby corrected as shown below:

In the Specification

Column 8, Line 34: Please correct equation " $\prod_{t \in \mathbb{T}^N} t$ " to read
-- $\prod_{t \in \mathbb{T}^N} t$ --

Column 9, Line 30, Equation 6: That portion of the equation reading " $\sum_{d(b) \in l(t,b)}$ " should read
-- $\sum_{d(b) \in l(t,b)}$ --

Column 10, Equation 8: That portion of the equation reading " $\max_{t \le k \le t+a} |\mathbb{T}|-1$ " should read
-- $\max_{t \le k \le t+a} |\mathbb{T}|-1$ --

Column 16, Lines 40-41: Please correct "BP1(1-1)" to read -- BP1 (*l*–1) --

Signed and Sealed this
Twenty-sixth Day of November, 2024

Katherine Kelly Vidal
*Director of the United States Patent and Trademark Office*

CERTIFICATE OF CORRECTION (continued)
U.S. Pat. No. 11,599,798 B2

In the Claims

Column 24, Claim 7: The formula should appear as follows:

$$\max_{1 \leq t \leq |T|-\alpha|T|+1} \left\{ \begin{array}{l} \sum_{k=t}^{t+\alpha|T|-1} \left[ \begin{array}{l} \sum_{d(b) \in I(k,b)} Size(d(b)) \\ + Size(O(k,b)) \end{array} \right] \\ - Size(\text{reused data}, b) \\ + \max_{t \leq k \leq t+\alpha|T|-1} \{WS(a_{fastest}(k), b)\} \end{array} \right\} + S_W$$

--  --